US 8,059,601 B2

(12) United States Patent
Choi et al.

(10) Patent No.: US 8,059,601 B2
(45) Date of Patent: Nov. 15, 2011

(54) APPARATUS AND METHOD FOR SEARCHING FOR WLAN IN PORTABLE TERMINAL

(75) Inventors: Chi-Won Choi, Seongnam-si (KR); Chang-Ho Son, Seongnam-si (KR)

(73) Assignee: Samsung Electronics Co., Ltd (KR)

(*) Notice: Subject to any disclaimer, the term of this patent is extended or adjusted under 35 U.S.C. 154(b) by 964 days.

(21) Appl. No.: 11/949,453

(22) Filed: Dec. 3, 2007

(65) Prior Publication Data

US 2008/0137626 A1 Jun. 12, 2008

(30) Foreign Application Priority Data

Dec. 1, 2006 (KR) .................. 10-2006-0120407

(51) Int. Cl.
*H04Q 7/00* (2006.01)
*H04L 12/28* (2006.01)
(52) U.S. Cl. ........................ 370/331; 370/400
(58) Field of Classification Search .................. None
See application file for complete search history.

(56) References Cited

U.S. PATENT DOCUMENTS

| | | | | |
|---|---|---|---|---|
| 2004/0063426 A1* | 4/2004 | Hunkeler | .................. | 455/426.1 |
| 2004/0152472 A1* | 8/2004 | Ono et al. | .................. | 455/456.1 |
| 2004/0266426 A1* | 12/2004 | Marsh et al. | ................ | 455/426.2 |
| 2006/0035636 A1* | 2/2006 | Pirila | .......................... | 455/435.2 |
| 2006/0126579 A1* | 6/2006 | Kim et al. | .................... | 370/338 |
| 2006/0140150 A1* | 6/2006 | Olvera-Hernandez et al. | ............................. | 370/331 |
| 2006/0148487 A1* | 7/2006 | Kim et al. | ................. | 455/456.1 |
| 2006/0229075 A1* | 10/2006 | Kim et al. | ..................... | 455/436 |
| 2007/0297358 A1* | 12/2007 | Chang et al. | .................. | 370/328 |
| 2008/0049673 A1* | 2/2008 | Park et al. | ..................... | 370/331 |
| 2009/0219819 A1* | 9/2009 | Haverinen et al. | ............ | 370/241 |

FOREIGN PATENT DOCUMENTS

| | | |
|---|---|---|
| JP | 2004-349863 | 12/2004 |
| JP | 2006-135727 | 5/2006 |
| KR | 1020040048146 | 6/2004 |
| KR | 1020040051315 | 6/2004 |
| KR | 1020060084002 | 7/2006 |

* cited by examiner

*Primary Examiner* — Hassan Phillips
*Assistant Examiner* — Eunsook Choi
(74) *Attorney, Agent, or Firm* — The Farrell Law Firm, P.C.

(57) ABSTRACT

Provided is an apparatus and method for searching for a WLAN in a portable terminal. The method includes, upon registering a WLAN, mapping and storing cell information on a present position and information on the registered WLAN; comparing the stored cell information with connected cell information when entering a mode concurrently supporting a cellular network and a WLAN in a state where a connection to the cellular network is made; and searching for a WLAN using the WLAN information mapped to the stored cell information, when the stored cell information is consistent with the connected cell information.

16 Claims, 2 Drawing Sheets

APPARATUS AND METHOD FOR SEARCHING FOR WLAN IN PORTABLE TERMINAL

PRIORITY

This application claims priority under 35 U.S.C. §119(a) to an application filed in the Korean Intellectual Property Office on Dec. 1, 2006 and assigned Serial No. 2006-120407, the contents of which are incorporated herein by reference.

BACKGROUND OF THE INVENTION

1. Field of the Invention

The present invention relates generally to an apparatus and method for searching a Wireless Local Area Network (WLAN) in a portable terminal, and in particular, to an apparatus and method for searching for a WLAN in a portable terminal, for previously storing cellular network information on a position at which a WLAN exists, thereby reducing the number of times of search for the WLAN.

2. Description of the Related Art

In recent years, as dual mode portable terminals supporting a handover of voice and data session between a cellular network and a Wireless Local Area Network (WLAN) have come into existence, research thereon is making progress.

In a conventional dual mode portable terminal, a WLAN module is periodically driven and a search for an accessible WLAN is conducted to use a service over the WLAN. However, such a method has a drawback in that unnecessary power consumption increases, because the terminal enables a WLAN module and searches for a WLAN. Accordingly, research and development has been made for a conventional method for connecting to a WLAN while reducing the power consumption. For example, there is a method in which WLAN information is added to a System Information Block (SIB) and broadcasted in a cellular network, and a portable terminal searches for a WLAN using the broadcasted WLAN information included in the SIB and connects to the WLAN. However, the method for connecting to a WLAN using the SIB has a drawback in that a network state should be modified to collect and manage WLAN information to be added to the SIB.

Accordingly, a method for searching for a WLAN is required, for preventing unnecessary power consumption of the portable without having an influence on a state of the network.

SUMMARY OF THE INVENTION

An aspect of the present invention is to substantially solve at least the above problems and/or disadvantages and to provide at least the advantages below. Accordingly, an aspect of the present invention is to provide an apparatus and method for searching for a WLAN in a portable terminal Another aspect of the present invention is to provide an apparatus and method for searching for a WLAN, for minimizing power consumption without having influence on a network state using a portable terminal.

A further aspect of the present invention is to provide an apparatus and method for mapping and storing cellular network information and WLAN information and searching for a WLAN in a portable terminal. According to one aspect of the present invention, there is provided a method for searching for a WLAN in a portable terminal. The method includes, upon registering a WLAN, mapping and storing cell information on a present position and information on the registered WLAN; comparing the stored cell information with in-connection cell information when entering a mode concurrently supporting a cellular network and a WLAN in a state where a connection to the cellular network is made; and when the stored cell information is consistent with the in-connection cell information, searching for a WLAN using the WLAN information mapped to the stored cell information.

According to another aspect of the present invention, there is provided an apparatus for searching for a WLAN in a portable terminal. The apparatus includes a network information acquirement unit, a network information storage unit, and a WLAN search decider. The network information acquirement unit acquires cell information from a base station of a connected cell and acquires WLAN information from an Access Point (AP) of a WLAN. When a specific WLAN is registered, the network information storage unit maps and stores cell information on an area where the terminal is positioned and information on the specific WLAN. The WLAN search decider compares the stored cell information with information on an in-connection cell and decides whether to search for a WLAN, when entering a mode concurrently supporting a cellular network and a WLAN in a state where a connection to the cellular network is made.

According to a further aspect of the present invention, there is provided a portable terminal for searching for a WLAN. The terminal includes a network information acquirement unit, a network information storage unit, and a WLAN search decider. The network information acquirement unit acquires cell information from a base station of a connected cell and acquires WLAN information from an Access Point (AP) of a WLAN. When a specific WLAN is registered, the network information storage unit maps and stores cell information on an area where the terminal is positioned and information on the specific WLAN. The WLAN search decider compares the stored cell information with information on an in-connection cell and decides whether to search for a WLAN, when entering a mode concurrently supporting a cellular network and a WLAN in a state where a connection to the cellular network is made.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

In the present invention, a description of an apparatus and method for mapping and storing cellular network and WLAN information and searching for a WLAN in a portable terminal will be made below. The following description will be made on the assumption that the portable terminal is connected to a cellular network.

Figure 1:
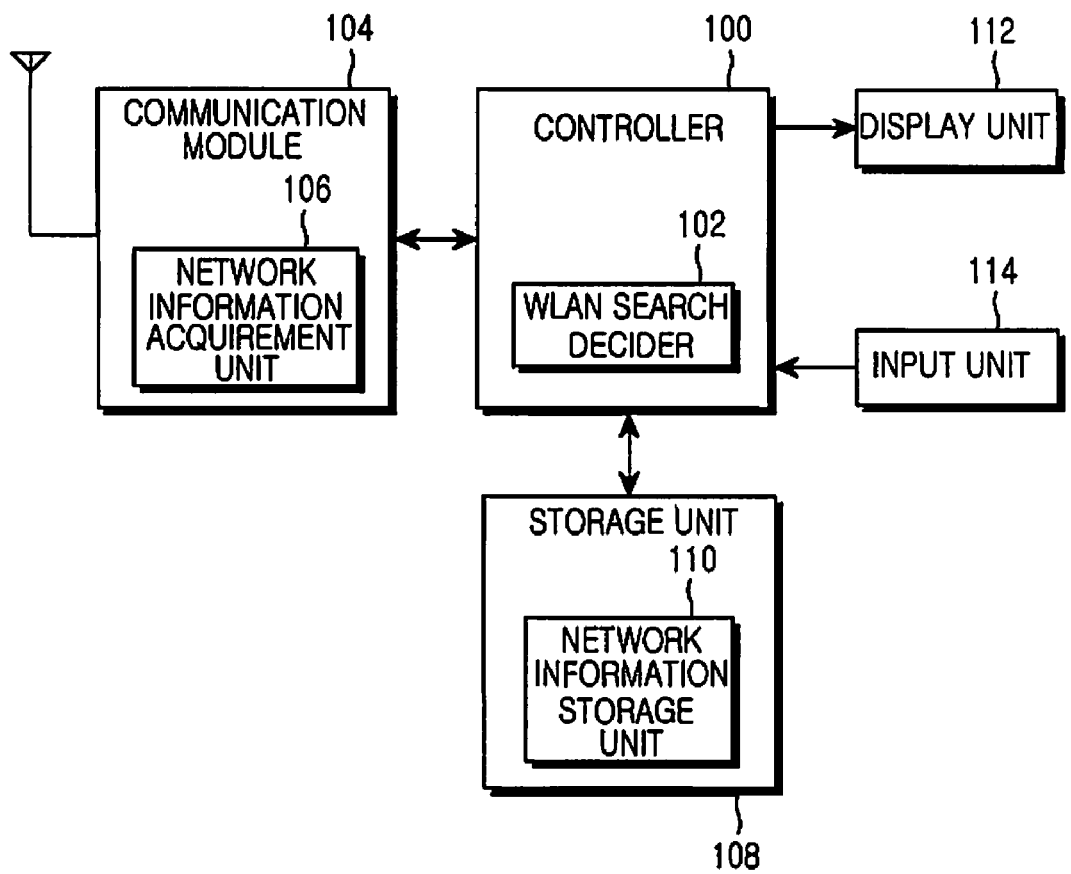
FIG. 1 is a block diagram illustrating an architecture of a portable terminal according to the present invention.

FIG. 1 is a block diagram illustrating an architecture of a portable terminal according to the present invention. The portable terminal includes a controller 100, a WLAN search decider 102, a communication module 104, a network information acquirement unit 106, a storage unit 108, a network information storage unit 110, a display unit 112, and an input unit 114.

Referring to FIG. 1, the controller 100 processes and controls a general function of the portable terminal, for example, functions for performing voice telephony and data communication. In particular, when a user registers a new WLAN, the controller 100 controls and processes a function of receiving information on a connected cell from the network information acquirement unit 106 and mapping and storing the received cell information and information on the registered WLAN in the network information storage unit 110 according to the present invention. The cell information signifies the inclusion of a Public Land Mobile Network IDentity (PLMNID), a Location Area Identity (LAI), a Routing Area Identity (RAI), a Primary Scrambling Code (PSC) of an in-connection cell, and a PSC of a neighbor cell. The WLAN information signifies the inclusion of a Service Set IDentity (SSID) and a Basic Service Set IDentity (BSSID). The PSC signifies a unique code for each cell. The reason why not only the PSC of the connected cell but also the PSC of the neighbor cell are stored is that a connection to the WLAN can be made even in the neighbor cell.

The controller 100 includes the WLAN search decider 102. Thus, when there occurs a dual mode operation event concurrently supporting the cellular network and the WLAN, the controller 100 decides whether to search for a WLAN using connected cell information and cell information stored in the network information storage unit 110. In other words, the WLAN search decider 102 receives connected cell information from the network information acquirement unit 106, reads cell information mapped with WLAN information and stored from the network information storage unit 110, and checks whether there is cell information consistent with the connected cell information among the stored cell information. The controller 100 provides WLAN information mapped with the consistent cell information and stored to the communication module 104 and sends a request for searching for a WLAN when checking that there is cell information consistent with the connected cell information among the stored cell information. Alternatively, the WLAN search decider 102 checks that the connected cell is changed when checking that there is not cell information consistent with the connected cell information among the stored cell information. When checking that the connected cell is changed, the WLAN search decider 102 again decides whether to search the WLAN using information on the changed cell and the cell information stored in the network information storage unit 110.

The communication module 104 includes a cellular network module and a WLAN module. The communication module 104 processes a signal exchanged with the cellular network and the WLAN. Specifically, the communication module 104 includes the network information acquirement unit 106 according to the present invention. Thus, the communication module 104 receives the cell information from a base station of a connected cell and provides the received cell information to the controller 100. The communication module 104 receives WLAN information from an Access Point (AP) of the registered WLAN and provides the received WLAN information to the controller 100.

The storage unit 108 stores a variety of programs for a general operation of the portable terminal, temporarily stores data generated in the operation of the portable terminal, and stores a system parameter and other storage data. Specifically, the storage unit 108 includes the network information storage unit 110 according to the present invention. Thus, the storage unit 108 maps and stores WLAN information and cell information received from the controller 100.

The display unit 112 displays each variety of information generated in operation of the portable terminal. Specifically, the display unit 112 displays a message in its predetermined position under the control of the controller 100 according to the present invention. The message informs a user whether the portable terminal is in a state where it can connect to the previously registered WLAN or not so.

The input unit 114 includes a plurality of numeric keys and function keys and provides data corresponding to a key pressed by a user to the controller 100. Specifically, the input unit receives key data for dual mode operation concurrently supporting the cellular network and the WLAN from the user and provides the received key data to the controller 100 according to the present invention.

Figure 2:
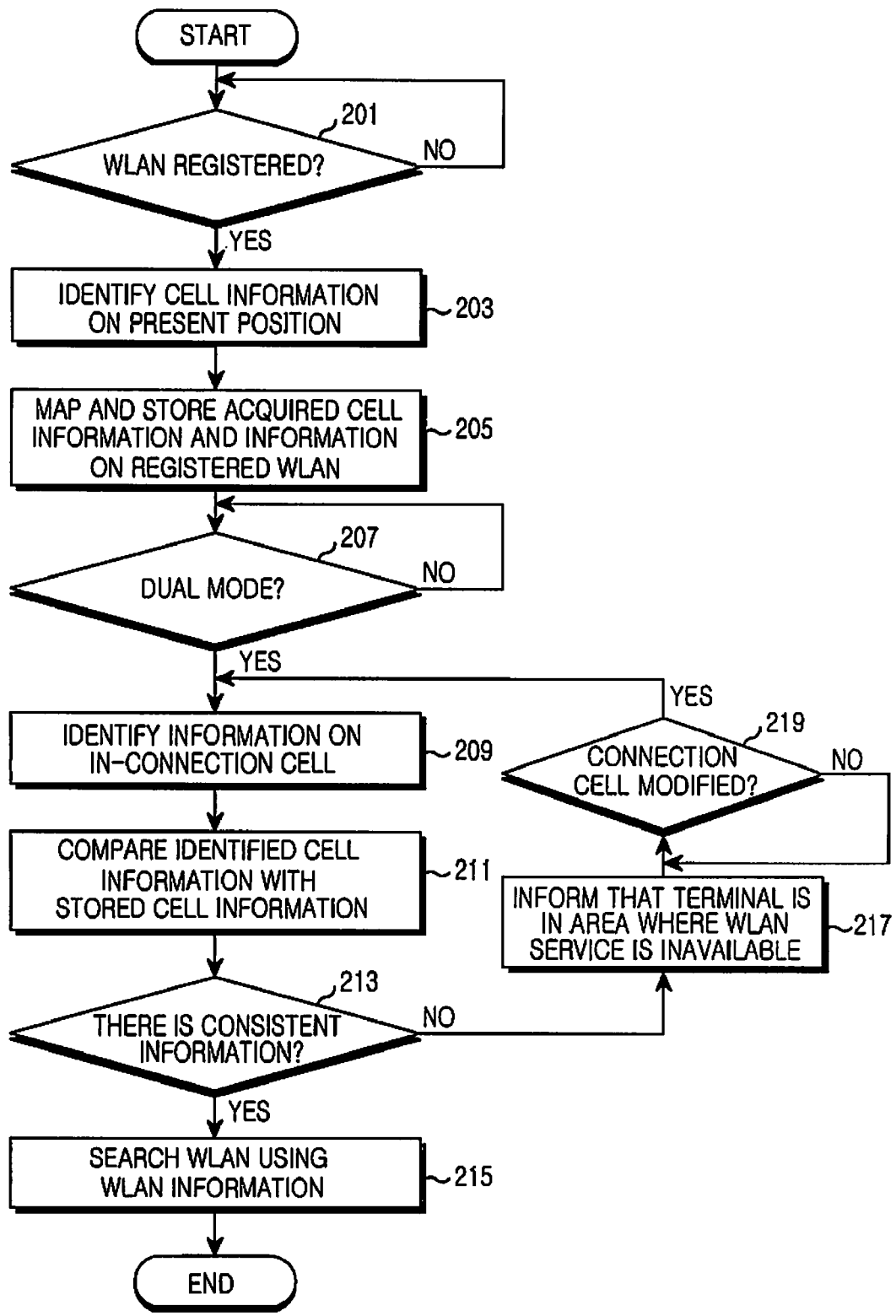
FIG. 2 is a flowchart illustrating a procedure for searching for a WLAN in a portable terminal according to the present invention.

FIG. 2 is a flowchart illustrating a procedure for searching for a WLAN in a portable terminal according to the present invention.

Referring to FIG. 2, in Step 201, the portable terminal checks whether a user registers a new WLAN. In Step 203, upon determining the new WLAN is registered, the portable terminal identifies cell information on a present position. In Step 205, the portable terminal maps and stores the identified cell information and registered WLAN information. The cell information signifies the inclusion of a PLMNID, an LAI, an RAI, a PSC of a connected cell, and a PSC of a neighbor cell. The WLAN information signifies the inclusion of an SSID and a BSSID. The PSC signifies a unique code for each cell. The reason why not only the PSC of the connected cell but also the PSC of the neighbor cell are stored is so a connection to the WLAN can be made, even in the neighbor cell.

In Step 207, the portable terminal checks whether there occurs a dual mode operation event, by a user, for concurrently supporting the cellular network and the WLAN. In Step 209, upon determining that the dual mode operation event has occurred, the portable terminal identifies information on a connected cell. In Step 211, the portable terminal compares the identified connected cell information with cell information mapped with WLAN information and stored in the network information storage unit 110.

In Step 213, the portable terminal checks from the comparison result whether there is cell information consistent with the identified connected cell information among the cell information mapped with the WLAN information and stored. In Step 215, upon determining that there is the cell information consistent with the identified connected cell information, the portable terminal searches for a WLAN using the WLAN information mapped with the cell information consistent with the connected cell information and stored. Then, the portable terminal shows that it is in a state where it can connect to the WLAN on a predetermined position of the display unit 112 and terminates the present process.

Alternatively, in Step 217, upon determining that the cell information consistent with the identified connected cell information is not present, the portable terminal shows that it is not in a state where it can connect to a previously registered WLAN in its present position at a predetermined position on the display unit 112-. In Step 219, the portable terminal checks whether the in-connection cell is changed. The portable terminal returns to the Step 209 when checking that the connected cell is changed. Then, the portable terminal again compares information on the changed cell with the cell information stored in the network information storage unit 110 and again performs the subsequent Steps.

As described above, the present invention compares information on a connected cell with information on a cell enabling a connection to a WLAN and decides whether to search for a WLAN in a portable terminal. By doing so, the present invention can limit the number searches for the WLAN and reduce an amount of power consumption in an area where a connection to the WLAN is disabled. Also, the present invention has an effect that it can use only information available in the portable terminal, thereby searching for the WLAN without having influence on a cellular network.

Alternate embodiments of the present invention can also comprise computer readable codes on a computer readable medium. The computer readable medium includes any data storage device that can store data that can be read by a computer system. Examples of a computer readable medium include magnetic storage media (such as Read Only Memory (ROM), floppy disks, and hard disks, among others), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for searching for a Wireless Local Area Network (WLAN) in a portable terminal, the method comprising:
   upon registering a WLAN, mapping and storing cell information, acquired from a base station, on a present position and information on the registered WLAN, acquired from an Access Point of a WLAN;
   when entering a mode concurrently supporting a cellular network and a WLAN in a state where a connection to the cellular network is made, comparing the stored cell information with connected cell information;
   searching for a WLAN using the WLAN information mapped to the stored cell information, when the stored cell information is consistent with the connected cell information;
   when the stored cell information is not consistent with the connected cell information, checking whether a connected cell of the terminal is changed; and
   upon determining that the connected cell has changed, comparing whether the stored cell information is consistent with information on the changed cell.

2. The method of claim 1, further comprising: when the stored cell information is not consistent with the connected cell information, informing a user of a state of the mobile terminal where a connection to a previously registered WLAN is disabled.

3. The method of claim 1, wherein the cell information comprises at least one of a Public Land Mobile Network IDentity (PLMNID), a Location Area Identity (LAI), a Routing Area Identity (RAI), a Primary Scrambling Code (PSC) of an in-connection cell, and a PSC of a neighbor cell.

4. The method of claim 1, wherein the WLAN information comprises at least one of a Service Set IDentity (SSID) and a Basic Service Set IDentity (BSSID).

5. An apparatus for searching for a WLAN in a portable terminal, the apparatus comprising:
   a network information acquirement unit for acquiring cell information from a base station of a connected cell and acquiring WLAN information from an Access Point (AP) of a WLAN;
   a network information storage unit for, when a specific WLAN is registered, mapping and storing cell information on an area where the terminal is positioned and information on the specific WLAN; and
   a WLAN search decider for when entering a mode concurrently supporting a cellular network and a WLAN in a state where a connection to the cellular network is made, comparing the stored cell information with information on the connected cell and deciding whether to search for a WLAN,
   wherein upon determining that the stored cell information is not consistent with the connected cell information, the WLAN search decider checks whether the connected cell of the terminal is changed and, upon determining that the connected cell of the terminal has changed, again decides whether to search the WLAN.

6. The apparatus of claim 5, wherein when the stored cell information is consistent with the connected cell information, the WLAN search decider decides to search for a WLAN corresponding to the WLAN information mapped to the stored cell information, when the stored cell information is consistent with the connected cell information.

7. The apparatus of claim 5, further comprising: a display unit for when the WLAN search decider determines that the stored cell information is not consistent with the connected cell information, informing a user of a state where a connection to a previously registered WLAN is disabled.

8. The apparatus of claim 5, wherein the cell information comprises at least one of a PLMNID, an LAI, an RAI, a PSC of a connected cell, and a PSC of a neighbor cell.

9. The apparatus of claim 5, wherein the WLAN information comprises at least one of an SSID and a BSSID.

10. A portable terminal for searching for a WLAN, wherein the terminal comprises:
    a network information acquirement unit for acquiring cell information from a base station of a connected cell and acquiring WLAN information from an Access Point (AP) of a WLAN;
    a network information storage unit for, when a specific WLAN is registered, mapping and storing cell information on an area where the terminal is positioned and information on the specific WLAN; and
    a WLAN search decider for comparing the stored cell information with information on a connected cell and deciding whether to search for a WLAN, when entering a mode concurrently supporting a cellular network and a WLAN in a state where a connection to the cellular network is made,
    wherein the WLAN search decider checks whether the connected cell of the terminal is changed and, upon checking so, again decides whether to search the WLAN, when checking that the stored cell information is not consistent with the connected cell information.

11. The portable terminal of claim 10, wherein the WLAN search decider decides to search for a WLAN corresponding to WLAN information mapped to the stored cell information, when the stored cell information is consistent with the connected cell information.

12. The portable terminal of claim 10, further comprising a display unit for informing a state where a connection to a previously registered WLAN is disabled when the WLAN search decider determines that the stored cell information is not consistent with the connected cell information.

13. The portable terminal of claim 10, wherein the cell information comprises at least one of a PLMNID, an LAI, an RAI, a PSC of an in-connection cell, and a PSC of a neighbor cell.

14. The portable terminal of claim 10, wherein the WLAN information comprises at least one of an SSID and a BSSID.

15. A method for searching for a Wireless Local Area Network (WLAN) in a portable terminal, the method comprising:
 mapping and storing cell information, acquired from a base station, on a present position and information on a registered WLAN, acquired from an Access Point of a WLAN;
 comparing the stored cell information with connected cell information of a connection to a cellular network is made; and
 searching for a WLAN using the WLAN information mapped to the stored cell information, when the stored cell information is consistent with the connected cell information,
 when the stored cell information is not consistent with the connected cell information, checking whether a connected cell of the terminal is changed; and
 upon determining that the connected cell has chanced, comparing whether the stored cell information is consistent with information on the changed cell.

16. A non-transitory computer-readable recording medium having recorded thereon a program for searching for a Wireless Local Area Network (WLAN) in a portable terminal, comprising:
 a first code segment, for mapping and storing cell information, acquired from a base station, on a present position and information on a registered WLAN, acquired from an Access Point of a WLAN;
 a second code segment, for comparing the stored cell information with connected cell information of a connection to a cellular network is made;
 a third code segment, for searching for a WLAN using the WLAN information mapped to the stored cell information, when the stored cell information is consistent with the connected cell information;
 a fourth code segment, for, when the stored cell information is not consistent with the connected cell information, checking whether a connected cell of the terminal is changed; and
 a fifth code segment, for, upon determining that the connected cell has changed, comparing whether the stored cell information is consistent with information on the changed cell.

* * * * *